United States Patent [19]

Bosacchi

[11] Patent Number: 5,614,839
[45] Date of Patent: Mar. 25, 1997

[54] METHOD FOR OPTICALLY TESTING FLAT PANEL DISPLAY BASE PLATES

[75] Inventor: Bruno Bosacchi, Belle Mead, N.J.

[73] Assignee: Lucent Technologies Inc., Murray Hill, N.J.

[21] Appl. No.: 590,696

[22] Filed: Jan. 16, 1996

Related U.S. Application Data

[63] Continuation of Ser. No. 327,751, Oct. 24, 1994, abandoned.

[51] Int. Cl.$^6$ .................... G01R 31/00; G01R 31/308
[52] U.S. Cl. ............................. 324/770; 324/753
[58] Field of Search ............................. 324/96, 770, 753, 324/754, 765

[56] References Cited

U.S. PATENT DOCUMENTS

| | | | |
|---|---|---|---|
| 4,906,922 | 3/1990 | Takahashi et al. | 324/753 |
| 5,034,683 | 7/1991 | Takahashi et al. | 324/753 |
| 5,124,635 | 6/1992 | Henley | 324/754 |
| 5,309,108 | 5/1994 | Maeda et al. | 324/501 |
| 5,406,213 | 4/1995 | Henley | 324/753 |
| 5,465,052 | 11/1995 | Henley | 324/770 |
| 5,504,438 | 4/1996 | Henley | 324/770 |

*Primary Examiner*—Kenneth A. Wieder
*Assistant Examiner*—Russell M. Kobert

[57] ABSTRACT

A flat panel display plate (10) comprising part of a liquid crystal display device is tested by overlying the plate with a probe plate (18) comprised of light-transmissive electrode (22) a light-transmissive electrode support (20), and a sensing layer (24). The probe plate in combination with the flat panel display plate (10) realize a conventional liquid crystal display device whose operation depends on the operability of the flat panel display plate. Thus, by observing the liquid crystal display device realized by the combination of the flat panel display plate (10) and the probing plate (18), defects in the flat panel display plate can be detected.

4 Claims, 1 Drawing Sheet

METHOD FOR OPTICALLY TESTING FLAT PANEL DISPLAY BASE PLATES

This application is a continuation of application Ser. No. 08/327,751, filed on Oct. 24, 1994 now abandoned.

TECHNICAL FIELD

This invention relates to a technique for non-invasively testing a flat member, such as a flat panel display or a semiconductor wafer.

BACKGROUND ART

Many electronic devices incorporate thin displays, often referred to as "flat-panel" displays, for displaying alphanumeric information or other types of indicia. The most common type of flat panel display is the liquid crystal display. A typical liquid crystal display device comprises a cell containing a volume liquid crystal material separated by a first and second transparent electrodes. Overlying the first and second electrodes are first and second polarizers, respectively. In response to an electric field, the liquid crystal material in the cell twists (rotates) the plane of polarization of the light passing therethrough. If the polarizers are crossed so that their planes or polarization are orthogonal to each other, then light will pass through the display when the electrodes are energized. Conversely, when the first and second polarizers are aligned, no light will pass through the cell. Generally, there are two types of liquid crystal displays. The first type of display, known as the "reflective-type", is characterized by mirror placed behind the second polarizer for reflecting the light exiting the second polarizer back into the cell. The other type of display, known as the "transmissive type", is characterized by a light source positioned behind the second polarizer for transmitting light through the cell when the cell is energized.

Liquid crystal displays can be made to display various indicia, including alphanumeric characters, by patterning one or both of the electrodes. As may be appreciated, the pattern of the electric field applied to the liquid crystal material is dependent on the spatial nature of the electrodes. With present day transmissive-type liquid crystal displays, the first electrode, (i.e., the one furthest from the light source) is usually uniform. In contrast, the second electrode (i.e., the one closest to the light source) is patterned into a plurality of discrete elements. Each discrete element corresponds to an individual portion (pixel) of the image produced by the liquid crystal display. By applying an electric field between the first electrode and an element of the second electrode, the energized element of the second electrode will pass light from the light source. As a result, the corresponding pixel in the image displayed by the liquid crystal display device appears bright. In the case of a color display, red, green and blue filters may be placed proximate to different elements of the second electrode to alter the color of the image displayed by the liquid crystal display.

Liquid crystal displays of the type described are each fabricated by forming a pair of flat panel display plates. Each flat panel display plate includes an electrode on a light transmissive electrode support, (e.g., a thin layer of plastic or glass). The electrode and its accompanying support may be adhered to a polarizer in the event that the support itself lacks the capability of polarizing light. Once a pair of flat panel display plates is formed, then a volume of liquid crystal material is placed between the plates to yield a liquid crystal display device.

During the fabrication process, it is desirable to test each flat panel display plate prior to final assembly. Present-day test techniques for non-invasively testing flat panel display plates are slow and thus limit plate throughput. Invasive techniques, while useful, are only suitable for sample lots, not for continuous testing.

Thus, them is a need for an easy-to-use, non-invasive technique for rapidly testing a flat-panel display plate.

BRIEF SUMMARY OF THE INVENTION

Briefly, in accordance with a preferred embodiment of the invention, a technique is provided for testing a flat panel display plate comprised of a light transmissive support having a light-transmissive electrode formed on one of its surfaces. The flat panel display plate may be an "active" plate, i.e., a plate having a patterned electrode. Alternatively, the plate may be a "passive" plate characterized by a solid electrode. The flat panel display plate is tested in accordance with the invention by the use of a probing plate that includes a light-transmissive electrode and an electro-optic layer, typically a volume of liquid crystal material, whose optical properties, for example, its birefringence or the spectral position of its absorption edge, change in the presence of an electric field.

In the case of birefringence, the flat panel display plate is tested by placing the probing plate in face-to-face relationship therewith so that the electro-optic layer on the probing plate faces the flat panel display plate. In the event that the flat panel display plate lacks a polarizer, then, the entire structure (i.e., the combination of the probing plate and the flat panel display plate) is sandwiched between two polarizers whose planes of polarization are oriented orthogonally to each other. If the flat panel display plate includes a polarizer, then, a single polarizer is juxtaposed to the probing plate. In this way, the resultant combination of the probing plate and flat panel display plate simulates a conventional liquid crystal display, During testing, a voltage is applied across the probing plate and flat panel display plate electrodes to generate an electric field across the sensing material carried by the probing plate. In response to the applied electric field, the optical characteristics of the sensing material associated with the probing plate will change. For example, when the flat-panel display plate has a patterned electrode, then the optical characteristics of the sensing material associated with the probing plate will be controlled by the electric field applied to the elements of the patterned electrode of the flat panel display plate. By observing the intensity of each pixel associated with image displayed by the liquid crystal display obtained by the combination of the flat panel display plate, the proper operation of the flat panel display plate can be determined.

The optical characteristics of the sensing material of the probing plate are monitored, either by physical observation or by automated techniques. For example, in a laboratory environment, the individual pixels associated with image displayed by the liquid crystal display, obtained by the combination of the probing plate and flat panel display plate, could be scanned by an optical beam, A detector (e.g., a photocell or a television camera) would be positioned to detect the intensity of each pixel. The output signal of the detector would then be analyzed or stored for subsequent analysis. In a manufacturing environment, all of the pixels associated with the image of the liquid crystal display obtained from the combination of the flat panel display plate and the probing plate could be observed, either manually, or automatically. Any inhomogeneities in the flat panel display plate would readily manifest themselves.

DETAILED DESCRIPTION

Figure 1:
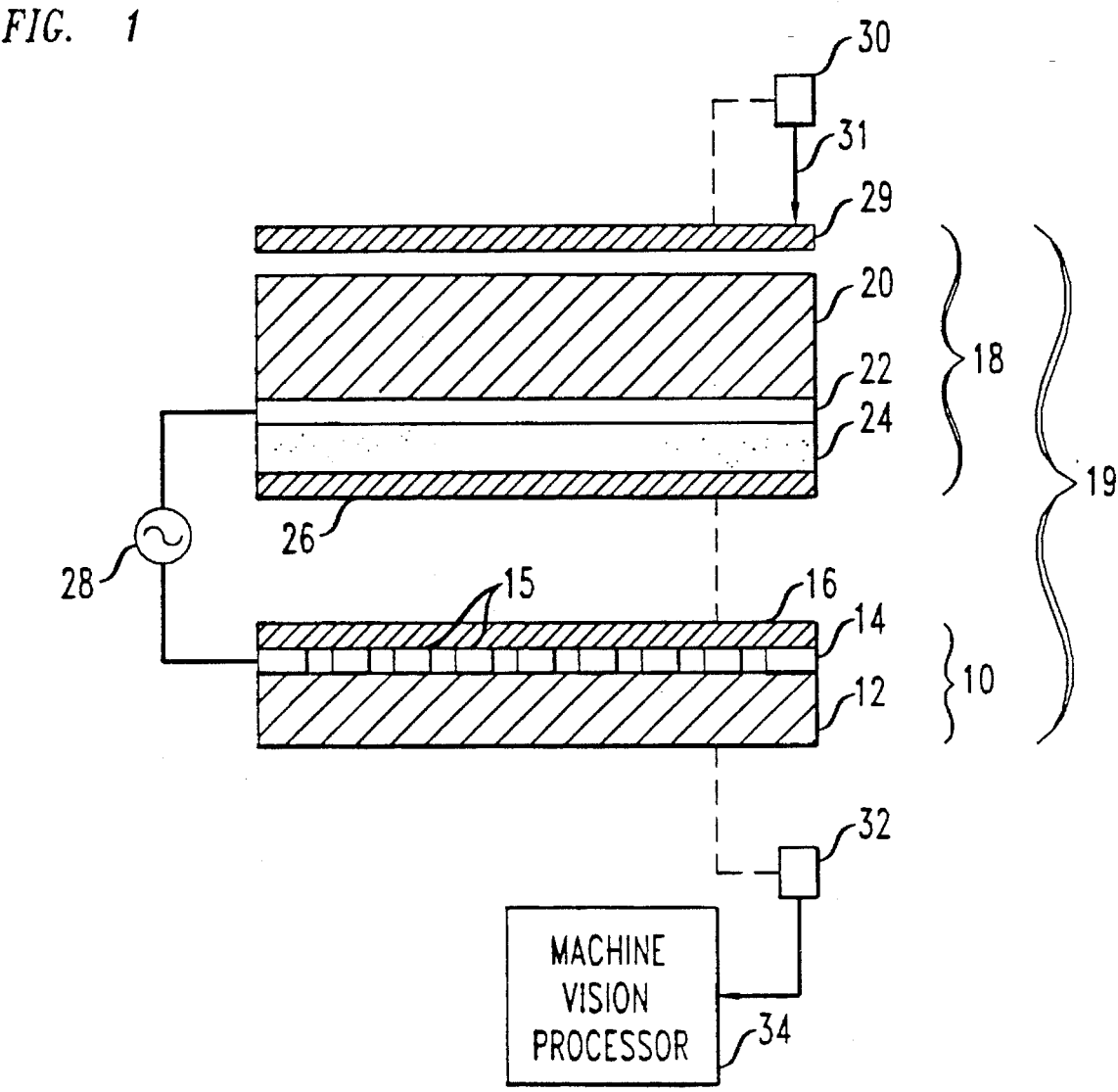
FIG. 1 is a side view in cross-section of a flat panel display plate positioned in face-to-face relationship with a probing plate in accordance with the invention to test the display plate.

FIG. 1 illustrates a flat panel display plate 10 comprising part of a flat panel display. In the illustrated embodiment, the flat panel display plate 10 comprises a light-transmissive support 12, (e.g., a thin plate of glass or plastic). In the case when the flat panel display plate 10 comprises part of a liquid crystal display, the support 12 must have the ability to polarize light. In the event that the support 12 itself lacks this capability, then, a polarizer (not shown) must be juxtaposed to the support. (For purposes of discussion, the support 12 serves to polarize the light passing through the flat panel display plate 10.) The upper surface of the support 12 is largely covered by at least one light transmissive electrode 14, formed of a thin layer of electrically conductive, light-transmissive material, such as tin oxide or the like. Associated with the electrode 14 is a driving circuit (not shown) comprised of a transistor and capacitor. An alignment layer 16, typically a thin layer of polyimide or the like, overlies the electrode 14 for of aligning the flat panel display plate 10 with another such plate (not shown) during fabrication of a flat panel display device. Typically, the alignment plate 16 facilitates alignment by way of striations (not shown) in its upper surface.

In the illustrated embodiment, the flat panel display plate 10 of FIG. 1 comprises one-half of a liquid crystal display device (not shown), the other half of the device comprising an upper plate of substantially similar construction that also carries a transparent, conducting electrode, typically made solid (uniform) whereas the electrode 14 is typically patterned into discrete elements 15. A liquid crystal display is realized from the flat panel display plate 10 and the upper plate by sandwiching a layer of liquid crystal material (not shown) between them. In the presence of an electric field, the liquid crystal material rotates by 90° the plane of polarization of the light passing therethrough.

Prior to fabricating a liquid crystal display of the type described, it is desirable to test the flat panel display plate 10 to verify the functionality of its electrode 14, including the functionality of each of its elements 15. While there exist a few commercially available techniques for non-invasively testing the flat panel display plate 10, these techniques have limitations that hinder their rapid and convenient use in a manufacturing environment. In accordance with the invention, the flat panel display plate 10 may be rapidly and efficiently testing by overlapping the it with a probing panel 18 having the same lateral dimensions to effectively simulate a liquid crystal display device 19. To that end, the probing plate 18 comprises a support member 20 formed of an optically transmissive material such as glass or plastic. A light-transmissive electrode 22 is adhered to the entire under surface of the support member 20 as seen in FIG. 1. In practice, the electrode 22 may be formed of tin oxide or the like.

Lying beneath the electrode 22 is a sensing layer 24 protected by a light-transmissive protective layer 26. The sensing layer 24 is made from a material with a high electro-optic coefficient. For example, the sensing layer 24 could be comprised of a layer of liquid crystal material embedded in a polymer film. Other types of electro-optic materials could also be used that exhibit a change in their light transmission characteristics, such as birefringence or a shift in the spectral position of its absorption edge, in response to an applied electric field. Correspondingly, the testing technique will have to be appropriately chosen in accordance with the optical properties of the sensing layer 24.

When the probing plate 18 is free from optical defects, then the performance of the liquid crystal display 19, obtained by combination of the flat panel display plate 10 and the probing plate, is directly related to the characteristics of the flat panel display plate. Upon the application of a voltage from a voltage source 28 to the electrodes 22 and one or more of the elements 15 of the electrode 14, an electrical field is generated that changes the optical characteristics of the sensing layer 24 of the probing plate 18. In particular, when subjected to an electric field, the sensing layer 24 rotates the plane of polarization of the light passing therethrough. This change in polarization can be detected by placing a polarizer 29 in registration with the probing plate 18. For example, when the polarizer 29 has its plane of polarization orthogonal to the plane of polarization of flat panel display plate 10, then no light passes in the absence of an electric field. This effect can be detected manually, or automatically, as described below. It should be noted that inhomogeneities in the gap between the probing plate 18 and the flat panel display plate 10 may locally affect the electric field generated between the electrodes 14 and 22. However, these can be minimized in various ways, such as by positioning the plates close together.

There are two possible approaches to testing functionality of each of the elements 15 of the electrode 14 of the flat panel display plate 10. To test the flat panel display plate 10 in accordance with the first approach, each of the individual elements 15 of the electrode 14 is energized in succession at the same time the electrode 22 of the probing plate 18 is energized. When each element 15 is energized, each corresponding pixel of the image displayed by the liquid crystal display 19 should appear bright. To detect each bright pixel in an automated fashion, a light source 30, such as a laser, is positioned opposite the probing plate 18 for directing a very narrow beam of radiation 31 into the plate for passage into the flat panel display plate 10. A detector 32, in the form of a photocell or a television camera, is positioned opposite the flat panel display plate 10 to detect that portion of the beam 31 (if any) passing through the plate. (Note that the position of the light source 30 and detector 32 could easily be reversed.)

The detector 32 supplies its output signal to a machine vision processor 34 programmed to store and analyze the detector output signal to determine the change (if any) in the optical properties of the sensing layer 24. Typically, flat panel display plate 10 and the probing plate 18 move relative to the light source 30 and the detector 32 so that the beam 31 spans the sensing layer 24 to allow each individual pixel to be imaged. Alternatively, the light source 30 and detector 30 could be displaced relative to the flat panel display plate 10 and the probing plate for more rapid scanning. The machine vision processor 34 may be coupled to a monitor 36 or another type of output device for providing output information indicative of which pixels are dark, and hence which elements 15 of the electrode 14 are non-functional.

The second approach to testing the flat panel display is to energize all of the elements 15 of the electrode 14 at once together with the electrode 22 of the probing plate 18. Those elements 15 of the electrode that are non-functional will manifest themselves as dark pixels in the image displayed by the liquid crystal display 19. Thus, by observing the image displayed by the liquid crystal display 19, inhomogeneities in the flat panel display plate 10 can be observed rapidly and will little difficulty. This second approach lends itself to a manufacturing environment where rapid screening of the quality of flat panel display plates is critical, as compared to the first approach that is more useful in a laboratory environment.

The foregoing describes a technique for testing a flat panel display plate 10 by overlapping it with a probing plate 18 to effectively realize a liquid crystal display device which, when energized will reveal the defects in the flat panel display plate. The technique of the invention affords the advantage that it is non-invasive and that it may be carried out rapidly and relatively easily without the need for any specialized hardware, other than the probing plate 18.

It is to be understood that the above-described embodiments are merely illustrative of the principles of the invention. Various modifications and changes may be made thereto by those skilled in the art which will embody the principles of the invention and fall within the spirit and scope thereof. For example, while the testing technique of the invention has been described in connection with testing a flat panel display plate, the test technique can also be used to test a semiconductor wafer, or a printed wiring board based on the electric field generated when operating properly. To accomplish such testing, the wafer or printed wiring board is overlapped with the probing plate 18. The change in the optical properties of the sensing layer 24 is observed, either manually or automatically, and then compared to the change observed for a good wafer or printed wiring board, respectively. In this way, a good wafer or printed wiring board can be distinguished from one that is bad.

What is claimed is:

1. A method for non-invasively testing a flat panel display plate comprised of a light-transmissive member having a first light-transmissive electrode formed on one of its surfaces, comprising the steps of:

placing a probing plate in temporary juxtaposition with the flat panel display plate to completely overlap the flat panel display plate, the probing plate including a second light-transmissive electrode and a layer of light-transmissive sensing material oriented for interpositioning between the first and second light-transmissive electrodes when the probing plate is positioned to completely overlap the flat panel display plate, the sensing material altering its light-transmissive properties in response to the presence of an electric field;

applying a voltage between the first and second electrodes to generate an electric field between them;

generating a beam of light that is directed into the probe plate for passage therethrough;

displacing the beam of light relative to the probe plate so that the beam of light scans across the probe plate; and receiving the light beam that passes through the probe plate as the light beam scans across the plate to detect defects that manifest themselves as variations in the light transmitted through the probe plate.

2. The method according to claim 1 wherein the step of receiving the light beam includes the step of positioning a television camera to receive the light that passes through the probe plate, the television camera generating an output signal that varies in accordance with light that passes through the probe plate.

3. The method according to claim 2 further including the step of processing the output signal of the television camera with a machine vision processor to automatically monitor the characteristics of the sensing material.

4. The method according to claim 1 wherein the first electrode has a plurality of multiple segments and wherein the multiple segments are energized in a predetermined temporal sequence.

* * * * *